United States Patent
Yonezawa

[11] Patent Number: 6,101,888
[45] Date of Patent: Aug. 15, 2000

[54] TRANSMISSION DEVICE

[75] Inventor: Keitaro Yonezawa, Kobe, Japan

[73] Assignee: Kabushiki Kaisha Kosmek, Japan

[21] Appl. No.: 09/182,673

[22] Filed: Oct. 30, 1998

[30] Foreign Application Priority Data

Oct. 31, 1997 [JP] Japan ..................................... 9-299762
Feb. 27, 1998 [JP] Japan ..................................... 10-46567

[51] Int. Cl.[7] .............................. F16H 25/08; B23Q 3/00
[52] U.S. Cl. ................................. 74/54; 74/409; 269/138
[58] Field of Search ............................. 74/54, 25, 125.5; 269/134, 136, 138

[56] References Cited

U.S. PATENT DOCUMENTS

| | | | |
|---|---|---|---|
| 4,701,068 | 10/1987 | Andrews et al. | .......................... 74/409 |
| 4,909,493 | 3/1990 | Yonezawa . | |
| 4,925,154 | 5/1990 | Baker | ........................................ 74/54 |
| 4,948,105 | 8/1990 | Yonezawa . | |
| 5,096,347 | 3/1992 | Kumagai et al. . | |
| 5,174,554 | 12/1992 | Yonezawa . | |
| 5,181,700 | 1/1993 | Yonezawa | ................................. 269/24 |
| 5,516,075 | 5/1996 | Itoi et al. | ..................................... 74/54 |
| 5,810,344 | 9/1998 | Nishimoto . | |

*Primary Examiner*—David M. Fenstermacher
*Attorney, Agent, or Firm*—Bacon & Thomas PLLC

[57] ABSTRACT

A driving member (15) of piston type has an upper side, on which an annular holder (28), upper and lower cams (31), (32), and a transmission sleeve (33) are arranged in order. An annular wedge space (35) is defined between the upper and lower cams (31) and (32). A plurality of wedging members (36) are inserted into the wedge space (35) and peripherally spaced apart at a predetermined distance. When the driving member (15) is driven upward, first a plurality of engaging balls (41) supported by the transmission sleeve (33) engage with a lower portion of a pull rod (12) and then a pushing surface (38) of the driving member (15) vertically separates the cams (31),(32) from each other through the wedging members (36). Thus the lower cam (32) drives the pull rod (12) downward through the transmission sleeve (33) and the engaging balls (41).

9 Claims, 7 Drawing Sheets

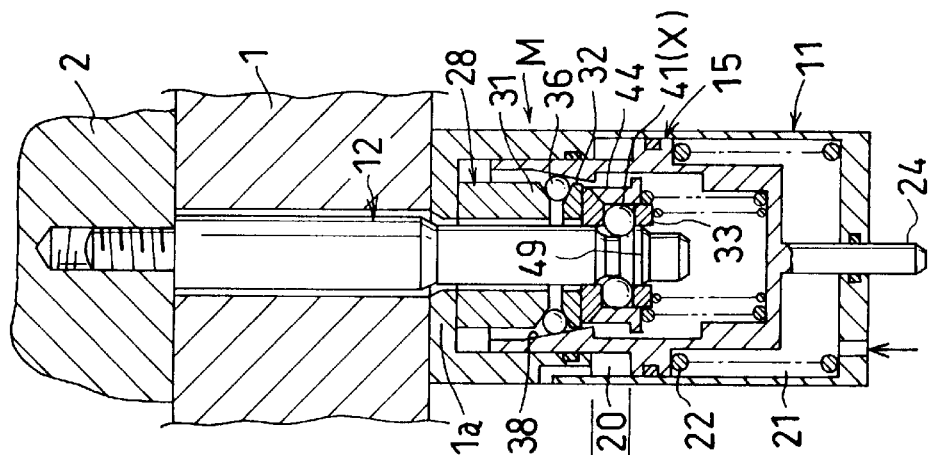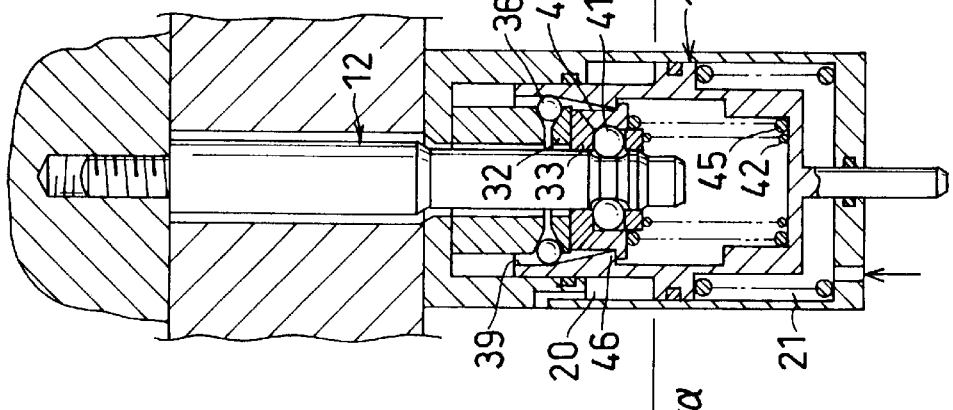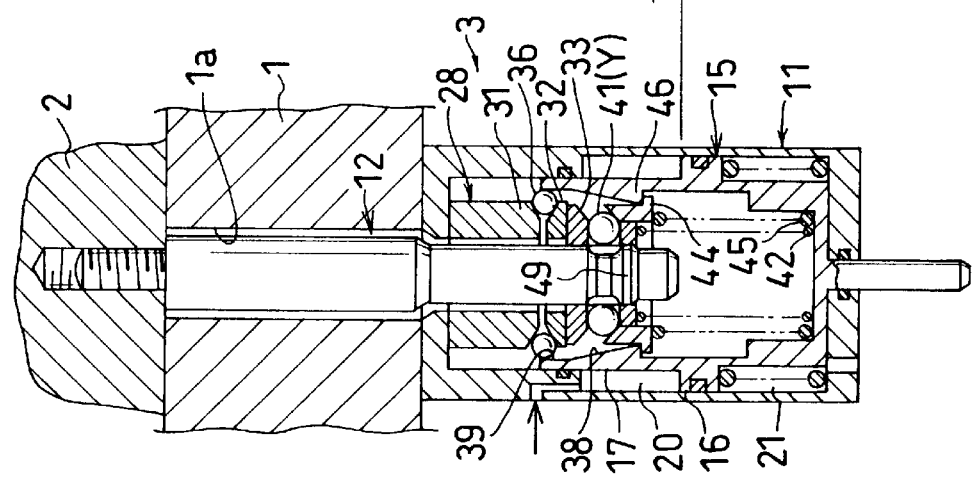

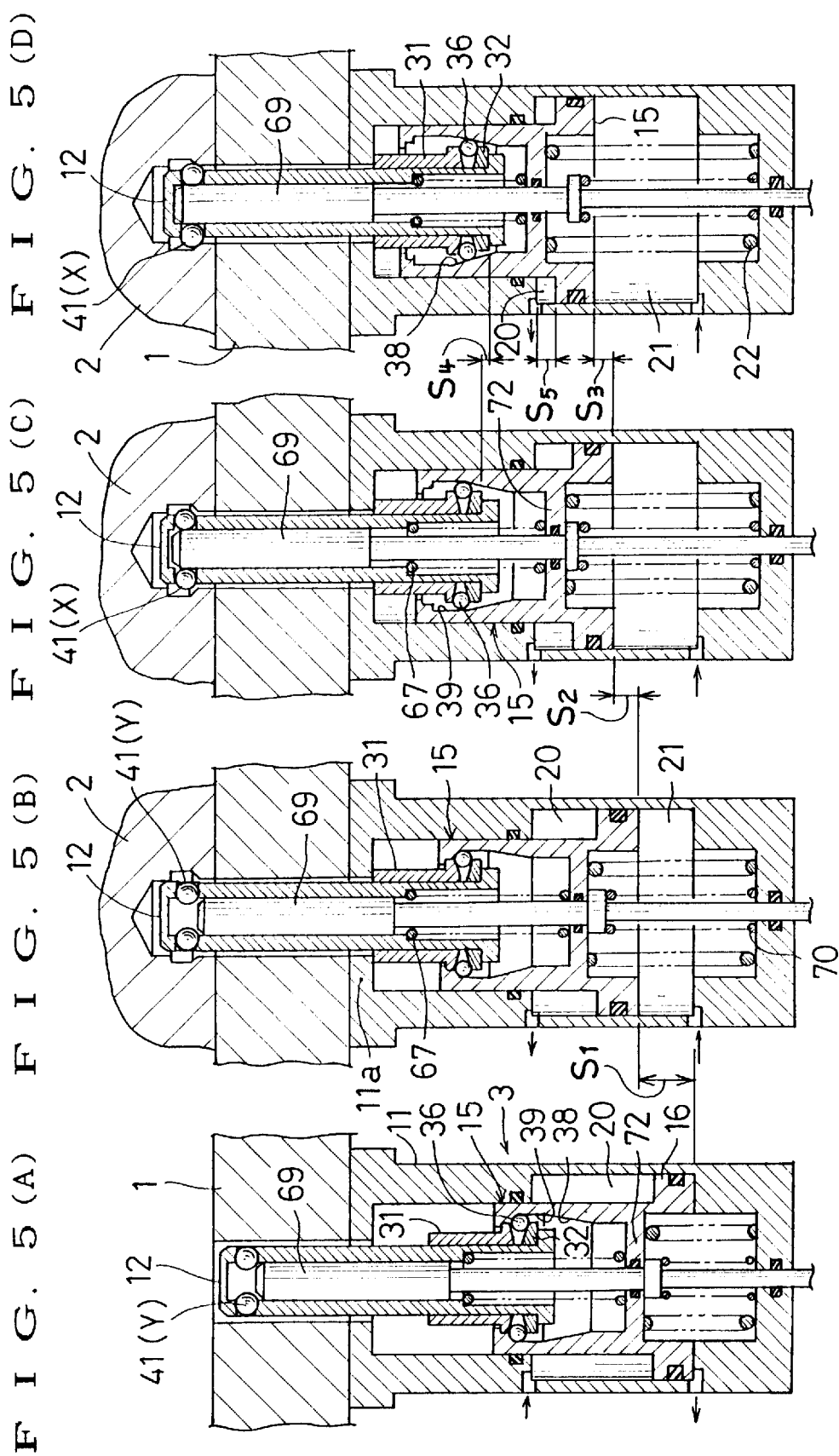

TRANSMISSION DEVICE

BACKGROUND OF THE INVENTION

1. Technical Field

The present invention relates to a device for multiplicably converting an output of a pneumatic cylinder or the like and transmitting the multiplicably converted output.

2. Description of the Earlier Technology

A mechanism utilizing a lever ratio of an arm has been generally known up to now as a multiplicably converting transmission device of this type.

However, the conventional mechanism needs to secure a space for swinging the arm and therefore has a disadvantage of enlarging the transmission device.

SUMMARY OF THE INVENTION

The present invention has an object to provide a novel transmission device for improving the disadvantage.

In order to accomplish the object, the present invention has constructed a transmission device in the following manner, for example, as shown in FIGS. 1 and 2, FIG. 3 or FIGS. 4 and 5.

A housing 11 includes an annular driving member 15 to be moved in a direction of an axis, two cams 31,32 opposing to each other in the axial direction and a driven rod 12, all of which are concentrically arranged in order from an exterior area. One cam 31 of the two cams 31,32 is connected to the housing 11 and the other cam 32 is connected to the driven rod 12. An annular wedge space 35 is defined between the two cams 31 and 32 so as to narrow toward the axis. The wedge space 35 has a plurality of wedging members 36 inserted thereinto and peripherally spaced apart at a predetermined distance. An axial driving force acted on the driving member 15 is adjusted so as to be transmitted to the driven rod 12 through the wedging members 36 and the other cam 32.

The present invention functions in the following manner, for example, as shown in FIGS. 2(A), 2(B), and 2(C).

In a condition of FIG. 2(A), the driving member 15 has descended and the wedging members 36 have moved radially outwards to make the two cams 31,32 vertically close to each other. When the driving member 15 is driven upward, the lower other cam 32 is connected to the driven rod 12 as shown in FIG. 2(B). Next, as shown in FIG. 2(C), the driving member (15) moves the wedging members 36 radially inwards (toward the axis) to thereby separate the two cams 31, 32 from each other vertically and strongly by a wedging action of the wedging members 36. One cam 31 is received by an upper end wall 11a of the housing 11 and the other cam 32 strongly and downwardly drives the driven rod 12.

As mentioned above, the present invention can multiplicably convert a driving force of the driving member by a wedging action and strongly transmit the multiplicably converted force to the driven rod. Thus when compared with the above-mentioned multiplier mechanism of conventional structure, it need not secure a large space for swinging the arm and therefore can make the transmission device compact.

In the case where the wedging member comprises a ball, a roller or the like rolling member, it can be smoothly driven with a small frictional resistance, which results in enhancing a transmission efficiency. Further, if the wedging member is formed in the shape of a roller, it decreases an acting force per unit area to result in lengthening the life span of the transmission device.

Further, a means for pushing the wedging members radially inwards has a simple and compact structure when it is formed from a pushing surface such as an inclined surface. However, it may employ other kinds of mechanisms such as an eccentric transmission mechanism or a cam transmission mechanism.

BRIEF DESCRIPTION OF THE DRAWINGS

FIG. 2(A) to FIG. 2(C) explain how the clamping apparatus of the first embodiment operates;

FIG. 5(A) to FIG. 5(D) explain how the third embodiment operates;

FIG. 6(A) is an end view when seen along a line 6A—6A in a direction indicated by arrows in FIG. 6(B);

FIG. 6(B) explains its operation. Its right half view shows a wedging member released from being pushed and its left half view illustrates the wedging member pushed;

FIG. 7(A) is an end view when seen along a line 7A—7A in a direction indicated by arrows in FIG. 7(B);

FIG. 7(B) explains its operation and corresponds to the left half view in FIG. 6(B)

DESCRIPTION OF THE PREFERRED EMBODIMENTS

Figure 1:
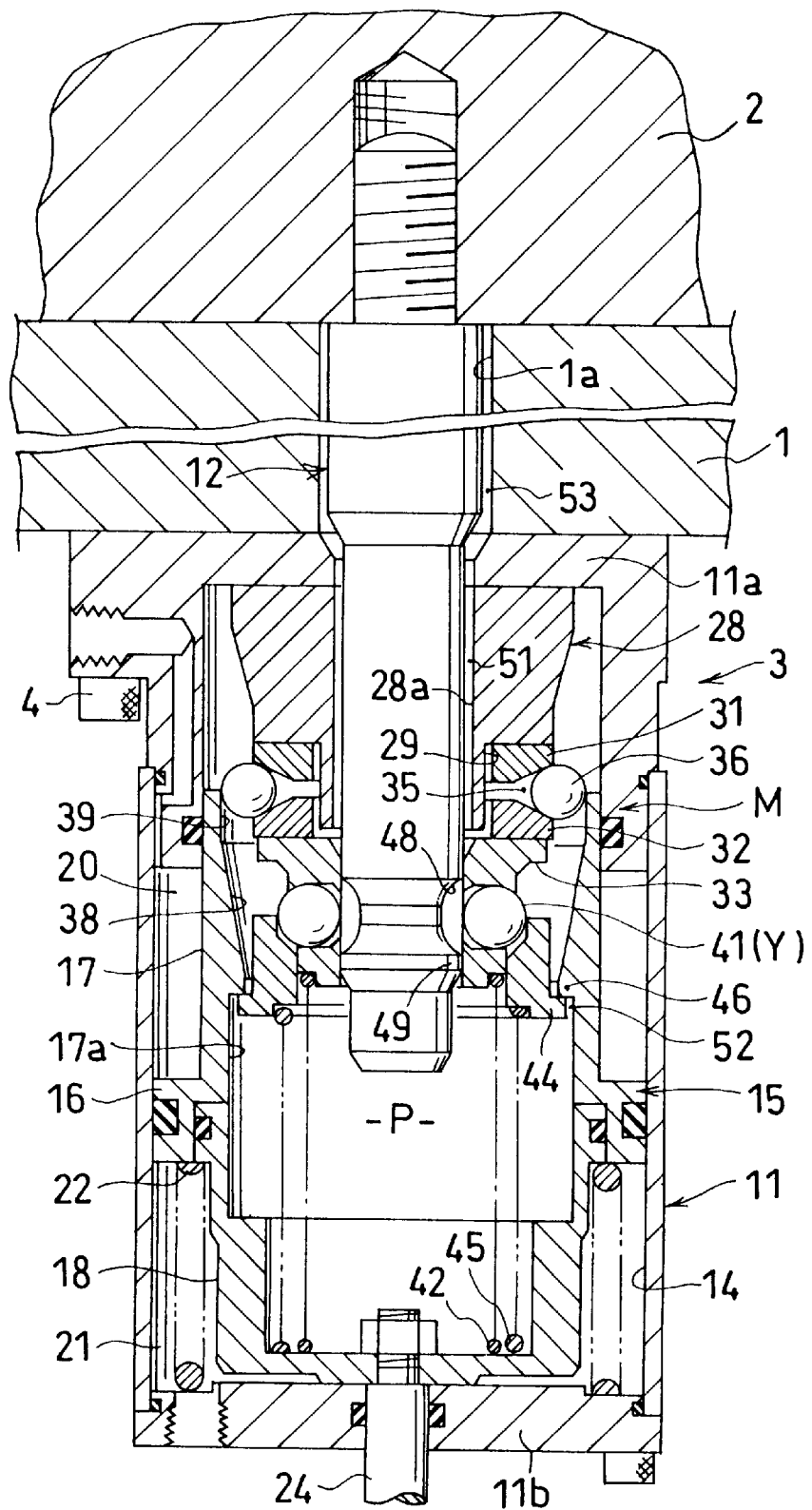
FIG. 1 is a vertical sectional view of a clamping apparatus utilizing a transmission device according to a first embodiment of the present invention while it is unclamped.

FIG. 1 and FIGS. 2(A), 2(B) and 2(C) show a first embodiment and illustrate a clamping apparatus utilizing a transmission device of the present invention. First, a structure of the clamping apparatus is explained by relying on a vertical sectional view of FIG. 1.

A metal mold 2 is placed on an upper surface of a table 1 of a press machine. The metal mold 2 is adapted to be pulled and fixed by a plurality of clamping apparatuses 3. However, only one of the clamping apparatuses 3 is shown here.

The clamping apparatus 3 comprises a housing 11, which is fixed to an under surface of the table 1 by a plurality of bolts 4 (here only one of them is shown). The metal mold 2 has a lower portion, to which a pull rod 12, namely a driven rod, is fixed in screw-thread engagement. The pull rod 12 is inserted into the housing 11 via a through hole 1a of the table 1.

The housing 11 has a guide bore 14, into which an annular driving member 15 is inserted vertically movably. The driving member 15 comprises a pneumatic piston 16, an output portion 17 projecting upwards from the piston 16 and a lower block 18 projecting downwards from the piston 16. The piston 16 has an upper side on which an unclamping actuation chamber 20 is formed and a lower side on which a clamping actuation chamber 21 is provided. The clamping actuation chamber 21 attaches a spring 22 for holding clamping condition thereto.

The lower block 18 has a below-mentioned detecting rod 24 fixed thereto. The detecting rod 24 projects downwards from a lower end wall 11b of the housing 11.

The guide bore 14 has an upper portion, in which an annular holder 28, an annular cam space 29 provided on a lower side of the holder 28, upper first and lower second cams 31,32 positioned in the cam space 29, and an annular transmission sleeve 33 are arranged substantially coaxially with the driving member 15 in order from above.

An annular wedge space 35 is defined between the first cam 31 and the second cam 32 vertically opposing to each other so as to narrow radially inwards. The wedge space 35 has a plurality of wedging members 36 inserted thereinto and peripherally spaced apart at a predetermined distance.

Figure 6A:
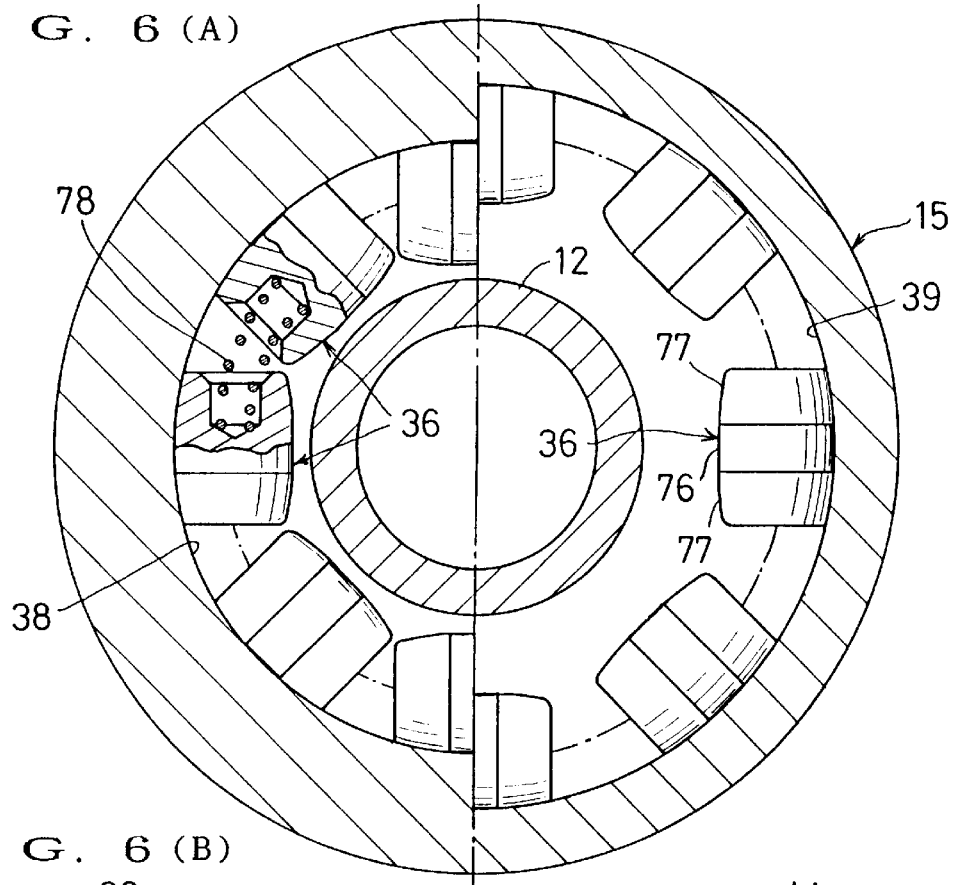
FIGS. 6(A) and 6(B) show a modification of a force multiplier provided in the transmission device of the present invention.
Figure 7A:
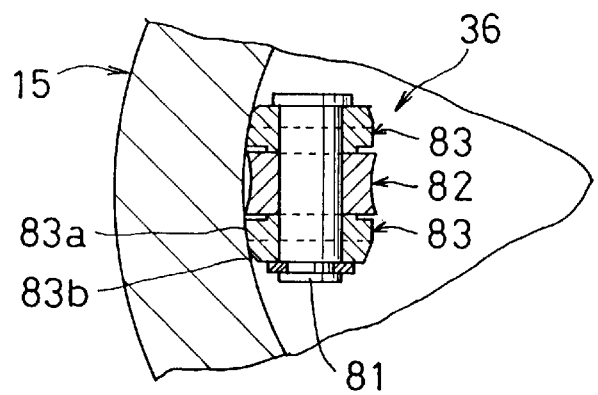
FIGS. 7(A) and 7(B) show another modification of the force multiplier.

Although the wedging members 36 are shown to be balls here, they are preferably formed in the shape of rollers as shown in FIG. 6(A) or FIG. 7(A) to be mentioned later.

The output portion 17 has a cylindrical hole 17a provided with a tapered pushing surface 38 for moving the wedging members 36 radially inwards and with a releasing surface 39 for allowing them to move radially outwards, in order from below. The tapered pushing surface 38 is in continuity with the releasing surface 39.

The transmission sleeve 33 radially movably supports a plurality of engaging balls (engaging members) 41 peripherally spaced apart at a predetermined distance. The transmission sleeve 33 is brought into butting contact with the second cam 32 by a pushing spring 42. An annular actuation member 44 is vertically movably inserted between the transmission sleeve 33 and the cylindrical hole 17a of the output portion 17. The actuation member 44 is urged upward by an advancing spring 45, a resilient means, to be received by a return member 46 provided at the output portion 17.

The pull rod 12 has a lower portion vertically provided with a peripheral groove 48 and with an input portion 49. The engaging balls 41 project into the peripheral groove 48, and they engage with the input portion 49.

A rod passage (P) into which the pull rod 12 is inserted, extends vertically long through the holder 28 and the transmission sleeve 33 to open into an upper end wall 11a, one end wall of the housing 11.

While a first aligning gap 51 is defined between a through hole 28a of the holder 28 and the pull rod 12, a second aligning gap 52 is provided between the cylindrical hole 17a of the output portion 17 and the actuation member 44. Further, a third aligning gap 53 is formed between the through hole 1a of the table 1 and the pull rod 12.

FIG. 1 and FIGS. 2(A), 2(B) and 2(C) explain how the clamping apparatus 3 operates. FIG. 2(A) shows an unclamping condition corresponding to FIG. 1 and FIG. 2(B) does the pull rod 12 chucked by the engaging balls 41. FIG. 2(C) illustrates a clamping condition.

When starting the metal mold 2 to descend toward the upper surface of the table 1, the clamping apparatus 3 is preliminarily switched over to the unclamping condition.

More specifically, as shown in FIG. 1 (or FIG. 2(A)), compressed air has been discharged from the clamping actuation chamber 21 and been supplied to the unclamping actuation chamber 20, thereby having lowered the driving member 15.

Thus the return member 46 has lowered the actuation member 44 and the engaging balls 41 are made movable to a radially outward retreated position (Y). Further, the wedging members 36 have opposed to the releasing surface 39 and then have moved radially outwards.

And when the metal mold 2 descends, if an axis of the rod passage (P) misaligns with that of the pull rod 12, the existence of the first aligning gap 51 smoothly inserts the pull rod 12 into the through hole 28a of the holder 28 and at the same time the existence of the second aligning gap 52 moves the actuation member 44 and the transmission sleeve 33 horizontally to thereby smoothly insert the pull rod 12 also into a through hole of the transmission sleeve 33. Thus the misalignment of the axes is automatically corrected with the result of receiving an under surface of the metal mold 2 by the upper surface of the table 1.

When switching over the unclamping condition of FIG. 2(A) to the clamping condition of FIG. 2(C), the compressed air is discharged from the unclamping actuation chamber 20 and is supplied to the clamping actuation chamber 21.

Then as shown in the chucking condition of FIG. 2(B), the driving member 15 ascends by a stroke ($\alpha$) and at the same time the advancing spring 45 raises the actuation member 44. Thus the actuation member 44 pushes the engaging balls 41 to a projected position (X). These engaging balls 41 engage with the pull rod 12.

Subsequently, as shown in FIG. 2(C), when the driving member 15 further ascends by a stroke ($\beta$), the pushing surface 38 is pushing the wedging members 36 strongly and radially inwards to thereby vertically and strongly separate the first cam 31 from the second cam 32 by a wedging action of the wedging members 36. And on being separated from each other, the first cam 31 is received by the upper end wall 11a of the housing 11 through the holder 28 and on the other hand the second cam 32 strongly pushes down the transmission sleeve 33. Thus the engaging balls 41 supported by the transmission sleeve 33 strongly lower the input portion 49 of the pull rod 12 and the pull rod 12 pulls and fixes the metal mold 2 to the table 1.

In other words, the first cam 31, the second cam 32, the wedging members 36 and the pushing surface 38 compose a force multiplier (M). The multiplier (M) multiplicably converts an upward driving force of the driving member 15 to a downward driving force of the transmission sleeve 33.

In the clamping condition of FIG. 2(C), even if the clamping actuation chamber 21 has its pressure reduced or lost for some reason, the spring 22 for holing clamping condition can apply a large sliding resistance to the components of the multiplier (M) with its urging force to thereby hold the clamping condition assuredly.

Character ($\gamma$) in FIG. 2(C) indicates an extra stroke of the driving member 15.

A sensor (not shown) is adapted to detect a height position of the detecting rod 24 vertically moving along with the driving member 15. It can be judged by an output signal of the sensor whether the clamping apparatus 3 is in the unclamping condition or in the clamping condition.

When switching over the clamping condition of FIG. 2(C) to the unclamping condition of FIG. 2(A), it is sufficient if the compressed air is discharged from the clamping actuation chamber 21 and is supplied to the unclamping actuation chamber 20.

Thus, first as shown in FIG. 2(B), when the driving member 15 goes down and the releasing surface 39 opposes to the wedging members 36, the wedging members 36 are allowed to move radially outwards. Subsequently, the return member 46 is moving the actuation member 44 downward relatively to the transmission sleeve 33 inhibited from descending by the pushing spring 42. This renders the engaging balls 41 free as shown in the unclamping condition of FIG. 2(A) (here the engaging balls 41 are shown to have been already changed over to the retreated position (Y)).

Thereafter, the metal mold 2 is raised. Then the input portion 49 of the pull rod 12 retracts the engaging balls 41 to the retreated position (Y) and therefore the pull rod 12 is smoothly extracted from the rod passage (P).

A more concrete structure of the force multiplier (M) is explained below.

The pushing surface 38 of the driving member 15 is inclined with respect to a vertical plane at an angle set to about 11 degrees. In other words, the pushing surface 38 has a cone angle of about 22 degrees.

Each cam face of the cams 31 and 32 is inclined with respect to a horizontal plane at an angle set to about 22.5 degrees. In other words, the wedge space 35 has a wedge angle of about 45 degrees.

The compressed air to be supplied to the clamping actuation chamber 21 has a pressure of 5 kg/cm$^2$ (about 0.49 MPa). At this time, the driving member 15 is adapted to produce an upward driving force of about 350 kgf (about 3400 N). Further, the spring 22 for holding clamping condition has an urging force set to 50 kgf (about 490 N).

When the clamping apparatus 3 was clamped under the above conditions, the pull rod 12 had a fastening force (here lowering force) of at least about 940 kgf (about 9200 N). At that time, even if an upward force of about 6000 kgf (about 59000 N) was acted on the metal mold 2, the clamping condition could be held.

Accordingly, the first embodiment can afford a fastening force (about 940 kgf) which is about 2.35 times a force (about 400 kgf) resultant from the driving force of the driving member 15 and the urging force of the spring 22 as well as a clamping condition holding force (about 6000 kgf) about 15 times the resultant force.

Further, in the case where the compressed air was discharged from the clamping actuation chamber 21 and the clamping condition was held only by the urging force of the spring 22, the clamping condition holding force was at least about 750 kgf (about 7400 N).

Although the inclination angle of the pushing surface 38 was set to about 11 degrees, it is preferably within a range of about 5 degrees to about 15 degrees and more preferably within a range of about 8 degrees to about 12 degrees.

The inclination angle of each cam face of the cams 31 and 32 was set to about 22.5 degrees. However, it is preferably within a range of about 15 degrees to about 30 degrees and more preferably within a range of about 20 degrees to about 25 degrees.

Notably, it is possible to obtain a fastening force of about 1.5 to 4 times and a clamping condition holding force of 10 times to substantially infinity by suitably selecting the respective inclination angles.

The first embodiment produces the following advantages.

The pushing surface 38 and the releasing surface 39 are axially arranged side by side in the cylindrical hole 17a of the output portion 17 of the driving member 15. This arrangement makes it possible to operate the wedging members 36 by a simple structure and construct the transmission device compact.

The releasing surface 39 and the pushing surface 38 are provided in order from above and the driving member 15 is upwardly driven to thereby drive the pull rod 12 downwardly. Thus it is possible to effectively utilize a space within a cylindrical hole of the driving member 15 and as a result make the transmission device compact.

A means for connecting the second cam 32 to the pull rod 12 comprises the transmission sleeve 33, the engaging members 41 and the actuation member 44. Therefore, a simple and compact construction can effect the connection and the disconnection.

The two cams 31,32 and the transmission sleeve 33 are axially arranged in order and the actuation member 44 is inserted between the transmission sleeve 33 and the cylindrical hole 17a of the output portion 17. Accordingly, the clamping apparatus can be made more compact by effectively utilizing the space within the cylindrical hole 17a.

Figure 3:
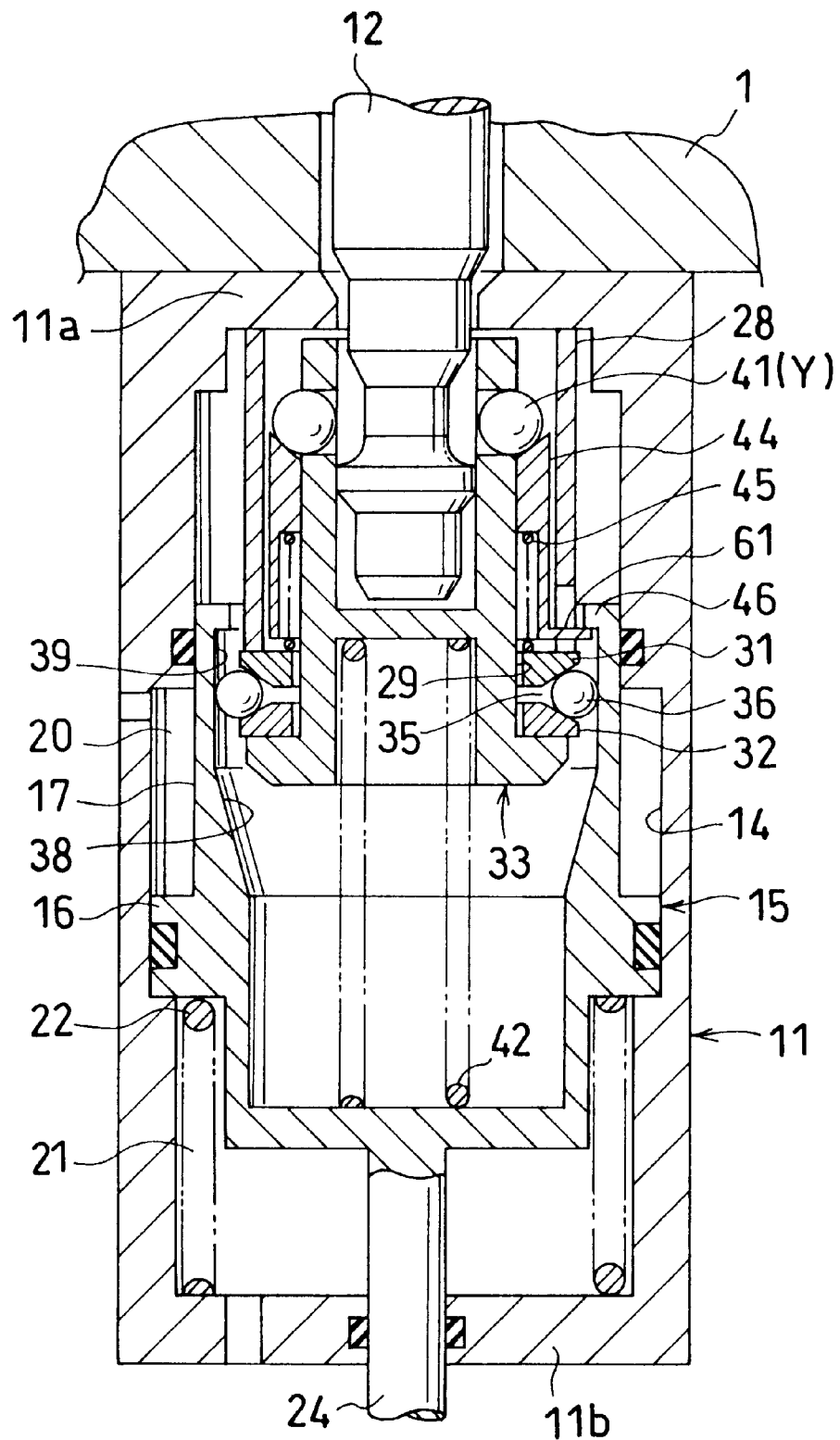
FIG. 3 is a vertical section view of a clamping apparatus utilizing a transmission device according to a second embodiment of the present invention while it is unclamped.
Figure 4:
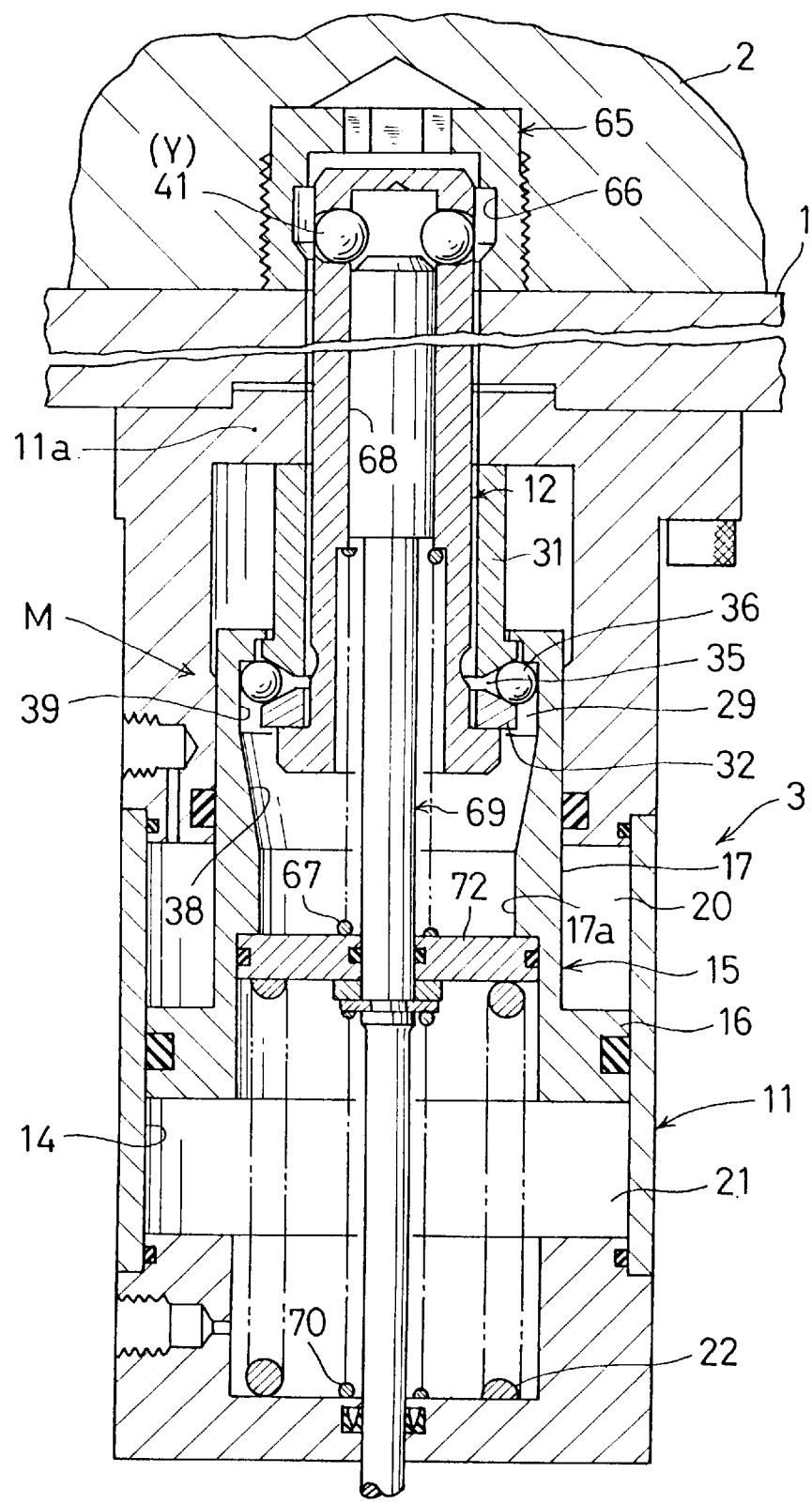
FIG. 4 is a vertical section view of a clamping apparatus utilizing a transmission device according to a third embodiment of the present invention while it is unclamped.

While FIG. 3 shows a second embodiment, FIGS. 4 and 5 illustrate a third embodiment. These other embodiments are explained by, in principle, putting the same characters to the members having the same functions as those of the first embodiment.

The second embodiment of FIG. 3 corresponds to FIG. 1. When compared with the apparatus of FIG. 1, it differs therefrom in arranging the wedging members 36 and the engaging balls 41 in a vertically opposite manner.

More specifically, in this second embodiment, the vertically elongated transmission sleeve 33 has an upper portion supporting the engaging balls 41 and a mid-height portion onto which the actuation member 44 is externally fitted. The transmission sleeve 33 has a lower portion onto which the first and second cams 31, 32 are externally fitted. The first cam 31 is received by the upper end wall 11a of the housing 11 through the holder 28 in the shape of a pipe. The advancing spring 45 is attached between the first cam 31 and the actuation member 44. The actuation member 44 has a lower portion projecting out of a lower portion of the holder 28. The projecting portion 61 engages with the return member 46 of the driving member 15.

FIGS. 4 and 5 show the third embodiment. FIG. 4 corresponds to FIG. 1 and illustrates the clamping apparatus while it is operating. FIG. 5(A) to FIG. 5(D) explain how the clamping apparatus operates.

When compared with the apparatus of FIG. 1, FIG. 4 shows the clamping apparatus 3 different therefrom in that its housing 11 is provided with the pull rod 12, which has a leading end supporting a plurality of engaging balls 41 and that the metal mold 2 has a lower portion fixing a mouthpiece 65 thereto in screw-thread engagement, which mouthpiece 65 is provided with a stepped hole 66.

More specifically, the pull rod 12 is inserted into the cylindrical hole 17a of the output portion 17 of the driving member 15 and is urged upward by a raising spring 67. The pull rod 12 has a cylindrical hole 68, into which an actuation rod 69 is inserted, and the actuation rod 69 is urged upward by a return spring 70.

There is interposed between a lower portion of the pull rod 12 and the output portion 17, the same force multiplier (M) as that of the first embodiment. In this case, the first cam 31 is brought into direct butting contact with the upper end wall 11a of the housing 11 and the second cam 32 is brought into direct butting contact with the lower portion of the pull rod 12.

The clamping apparatus 3 operates in the following manner as shown in FIG. 5.

In a retreated condition of FIG. 5(A), compressed air has been discharged from the clamping actuation chamber 21 and been supplied to the unclamping actuation chamber 20.

Thus the driving member 15 has moved the pull rod 12 downwards of the upper surface of the table 1 through the both cams 31,32 and the wedging members 36 and a spring retaining plate 72 has lowered the actuation rod 69.

When switching over the retreated condition of FIG. 5(A) to a clamping condition of FIG. 5(D), the compressed air is discharged from the unclamping actuation chamber 20 and is supplied to the clamping actuation chamber 21.

Then, first as shown in FIG. 5(B), the driving member 15 is raised and at the same time the pull rod 12 and the actuation rod 69 go up by the respective urging forces of the springs 67 and 70. As shown in FIG. 5(B), when the driving member 15 rises by a stroke ($S_1$) to have the first cam 31 received by the upper end wall 11a of the housing 11, the pull rod 12 is inhibited from going up.

Next, as shown in FIG. 5(C), when the driving member 15 and the actuation rod 69 further ascend by a stroke ($S_2$) relatively to the pull rod 12 inhibited from going up, the engaging balls 41 at the leading end of the pull rod 12 are pushed to the projected position (X) by the actuation rod 69.

Subsequently, as shown in FIG. 5(D), when the driving member 15 further ascends by a stroke ($S_3$), the pushing surface 38 is strongly and radially pushing the wedging members 36 inwards. A wedging action of the wedging members 36 strongly and vertically separates the first cam 31 from the second cam 32 to produce a separating force. The separating force strongly lowers the pull rod 12 by a stroke ($S_4$). Thus the pull rod 12 pulls and fixes the metal mold 2 to the table 1 through the engaging balls 41. Character ($S_5$) indicates an extra stroke.

When switching over the clamping condition of FIG. 5(D) to the retreated condition of FIG. 5(A), it is sufficient if the compressed air is discharged from the clamping actuation chamber 21 and is supplied to the unclamping actuation chamber 20.

Thus, first as shown in FIG. 5(C), when the driving member 15 descends and the releasing surface 39 opposes to the wedging members 36, the wedging members 36 are allowed to move radially outwards and therefore the pull rod 12 ascends by the raising spring 67.

Subsequently, the spring retaining plate 72 of the driving member 15 lowers the actuation rod 69, thereby allowing the engaging balls 41 to move to the retreated position (Y) as shown in FIG. 5(B). Thereafter, the driving member 15 lowers the pull rod 12 to thereby secure the retreated condition of FIG. 5(A).

Figure 6B:
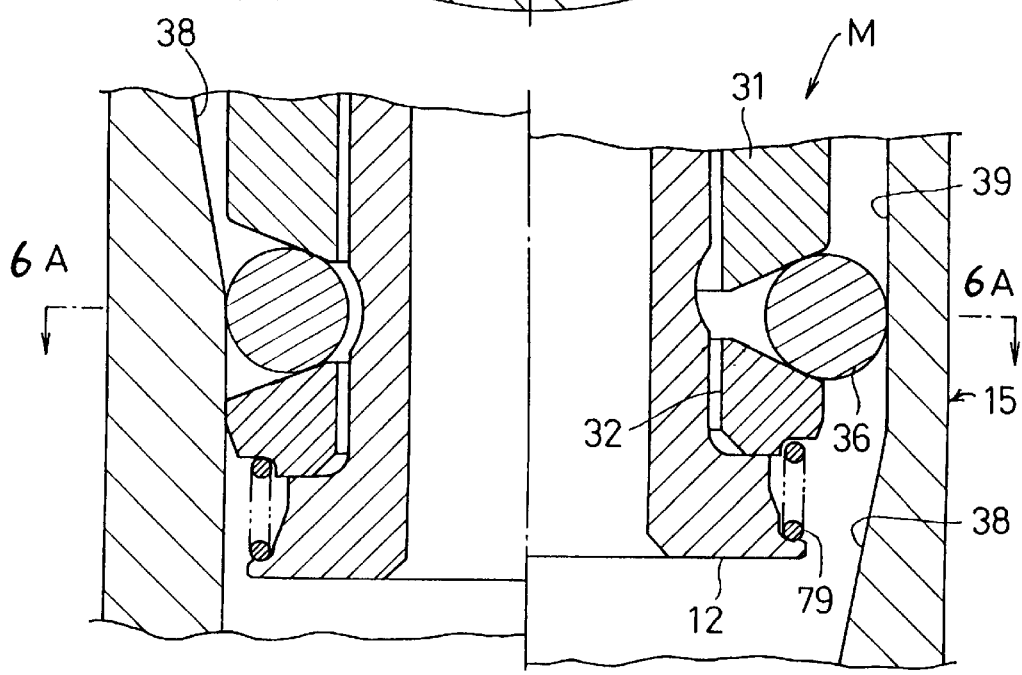

FIGS. 6(A) and 6(B) show a modification of the force multiplier (M). FIG. 6(A) is an end view when seen along a line 6A—6A in a direction indicated by arrows in FIG. 6(B). FIG. 6(B) explains its operation. Its right half view shows a wedging member 36 released from being pushed and its left half view illustrates the wedging member 36 pushed.

The wedging member 36 comprises a circular surface portion 76 at its mid portion and spherical surface portions 77,77 at its opposite end portions. Further, an aligning spring 78 is attached between adjacent wedging members 36,36 and a return spring 79 is attached between the second cam 32 and the lower portion of the pull rod 12.

The wedging members 36 of the roller type are brought into substantially even butting contact with the pushing surface 38 of the driving member 15, when compared with the above-mentioned ones of ball type. Accordingly, they are pushed by the pushing surface 38 with a largely reduced acting force per unit area to result in lengthening the life span of the force multiplier (M).

The wedging member 36 of the roller type may comprise the spherical surface portion 77 in its entire outer peripheral surface.

Figure 7B:
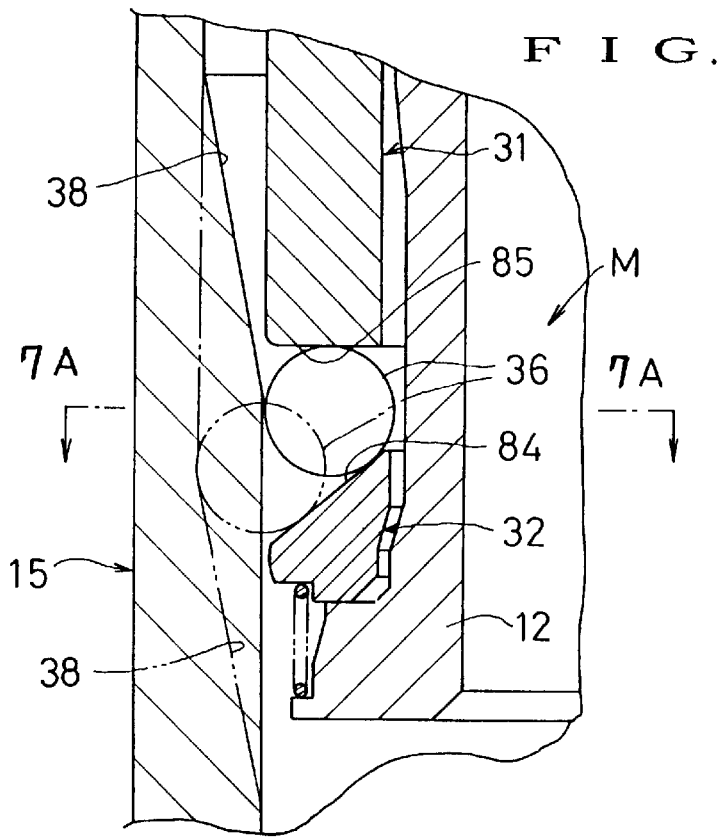

FIGS. 7(A) and 7(B) show another modification of the force multiplier (M), which forms the wedging member 36 into another roller type. FIG. 7(A) is an end view when seen along a line 7A—7A in a direction indicated by arrows in FIG. 7(B). FIG. 7(B) explains its operation and corresponds to the left half view in FIG. 6(B).

The modified wedging member 36 comprises a pin 81, a central roller 82 and end rollers 83,83. The central roller 82 has an outer peripheral surface concaved in the shape of an arc at its mid portion. Thus the arc-shaped roller outer peripheral surface is brought into even butting contact with an inclined peripheral surface 84 of the second cam 32 in its entirety and therefore the central roller 82 rolls with a small acting force per unit area.

Each of the end rollers 83 comprises a circular surface portion 83a and a spherical surface portion 83b. The circular surface portion 83a is brought into butting contact with a lower plane 85 of the first cam 31 and rolls with a small acting force per unit area. The spherical surface portion 83b is brought into even butting contact with the tapered pushing surface 38 of the driving member 15 and pushed with a small acting force per unit area. The wedging member 36 of the another roller type can widely reduce a frictional resistance caused at the time of clamp driving. Therefore, it can increase a clamping force and besides prevent contact portions from seizing to result in lengthening the life span of the force multiplier (M).

Figure 7C:
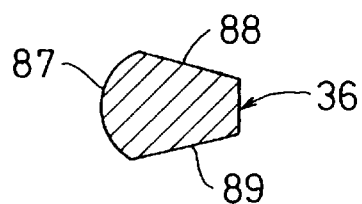
FIG. 7(C) is a sectional view showing still another modification of the wedging member.

FIG. 7(C) is a vertical sectional view showing still another modification of the wedging member 36.

The further modified wedging member 36 comprises a spherical surface portion 87, an upper tapered surface portion 88 and a lower tapered surface portion 89, which are brought into butting contact with the tapered pushing surface, the first cam and the second cam, respectively.

The above-mentioned respective embodiments and modifications may be further modified as follows.

A working fluid for the driving member of piston type may be other kinds of gas or liquid such as pressurized oil instead of the compressed air. The driving member may utilize a motor or the like other kinds of actuators instead of fluid pressure.

The engaging members may be formed in columnar, trust-conical or the like other shapes instead of balls.

Each cam face of the first and second cams may be moderately curved instead of being linear when seen in section. This is the same to the pushing surface 38.

The clamping apparatus may fix a workpiece or the like other kinds of objects to be fixed, instead of the metal mold. Further, the object to be fixed may be fixed by one clamping apparatus instead of by a plurality of clamping apparatuses.

The object to be fixed may be connected to or disconnected from the clamping apparatus in a horizontal direction or an inclined direction instead of the illustrated vertical direction.

The multiplicably converting transmission device according to the present invention is suitably used for the clamping apparatus. But, of course, it can be employed for other kinds of apparatuses.

What is claimed is:

1. A transmission device comprising:
   a housing (11) having an axis, in which an annular driving member (15) movable in the axial direction, two cams (31, 32) opposing to each other in the axial direction, and a driven rod (12) are concentrically arranged in order such that the two cams (31, 32) are situated generally between the driving member (15) and the driven rod (12);

one cam (31) of the two cams (31, 32) being connected to the housing (11) and the other cam (32) being connected to the driven rod (12);

an annular wedge space (35) being defined between the two cams (31, 32) so as to narrow toward the axis; and a plurality of wedging members (36) being inserted into the wedge space (35) and peripherally spaced apart at a predetermined distance such that an axial driving force acting on the driving member (15) is transmitted to the driven rod (12) through the wedging members (36) and the other cam (32).

2. A transmission device as set forth in claim 1, wherein the wedging members (36) are formed from rolling members.

3. A transmission device as set forth in claim 2, wherein the driving member (15) is provided with an output portion (17) having a cylindrical hole (17a), the cylindrical hole (17a) having a pushing surface (38) and a releasing surface (39) arranged side by side in the axial direction, the pushing surface (38) moving the wedging members (36) toward the axis and the releasing surface (39) allowing the wedging members (36) to move away from the axis.

4. A transmission device as set forth in claim 3, wherein the releasing surface (39) and the pushing surface (38) are provided in order from a first axial end to a second axial end, the driven rod (12) being adapted to be driven toward the second axial end by driving the driving member (15) toward the first axial end.

5. A transmission device as set forth in claim 1, wherein a means for connecting the other cam (32) to the driven rod (12) comprises a transmission sleeve (33) connected to the other cam (32), a plurality of engaging members (41) supported by the transmission sleeve (33) so as to be radially movable, and an actuation member (44) which engages these engaging members (41) with the driven rod (12).

6. A transmission device as set forth in claim 5, wherein the two cams (31,32) and the transmission sleeve (33) are arranged in order in the axial direction, the actuation member (44) being inserted between the transmission sleeve (33) and the driving member (15).

7. A transmission device as set forth in claim 2, wherein a means for connecting the other cam (32) to the driven rod (12) comprises a transmission sleeve (33) connected to the other cam (32), a plurality of engaging members (41) supported by the transmission sleeve (33) so as to be radially movable, and an actuation member (44) which engages these engaging members (41) with the driven rod (12).

8. A transmission device as set forth in claim 3, wherein a means for connecting the other cam (32) to the driven rod (12) comprises a transmission sleeve (33) connected to the other cam (32), a plurality of engaging members (41) supported by the transmission sleeve (33) so as to be radially movable, and an actuation member (44) which engages these engaging members (41) with the driven rod (12).

9. A transmission device as set forth in claim 4, wherein a means for connecting the other cam (32) to the driven rod (12) comprises a transmission sleeve (33) connected to the other cam (32), a plurality of engaging members (41) supported by the transmission sleeve (33) so as to be radially movable, and an actuation member (44) which engages these engaging members (41) with the driven rod (12).

* * * * *